May 16, 1967 F. B. HUNTER 3,319,876
SEALING MECHANISM FOR OIL DIFFUSION PUMP
Filed May 1, 1963 2 Sheets-Sheet 1

INVENTOR.
FRANK B. HUNTER
BY
Stuart W. Wohlgemuth
ATTORNEY

May 16, 1967 F. B. HUNTER 3,319,876
SEALING MECHANISM FOR OIL DIFFUSION PUMP
Filed May 1, 1963 2 Sheets-Sheet 2

INVENTOR.
FRANK B. HUNTER
BY
Stuart W. Wohlgemuth
ATTORNEY

United States Patent Office 3,319,876
Patented May 16, 1967

3,319,876
SEALING MECHANISM FOR OIL DIFFUSION
PUMP
Frank B. Hunter, Woodland Hills, Calif., assignor to
North American Aviation, Inc.
Filed May 1, 1963, Ser. No. 277,380
4 Claims. (Cl. 230—101)

This invention relates to a means for providing a rotating shaft in a high vacuum system. More particularly the invention pertains to a means for introducing a rotating shaft into a high vacuum system from atmospheric environment utilizing a particular sealing concept.

With the advent of the space age, various experimental research programs are carried on to study effects of an environment simulating outer space. The outer space environment is substantially a vacuum and as a result it has become necessary to provide vacuum chambers for the testing of various materials, seals and other apparatus intended for eventual use in spacecraft in outer space. Normally testing in the essentially vacuum atmosphere is done inside tanks which have attached thereto one or more vacuum oil diffusion pumps which draw the vacuum in the tanks. Within the simulated space environment of the chamber under vacuum, it has been found particularly desirable to test various materials at rotational contact with one another for utilization as bearings or like members in outer space applications. However, a problem has been presented in further transmission of rotary or reciprocating motion from an external environment into such a vacuum chamber without degradation of the vacuum.

To obtain the desired rotary motion, one can not place a motor within the vacuum chamber to drive the shaft. One reason for this is that the outgassing of a motor would destroy to a large extent the vacuum desired. The second reason for not inserting a motor for driving the shaft by placing it within the vacuum chamber is that the brushes could not be lubricated since known lubricants do not function in a vacuum environment. To date, no motor has been designed which could successfully operate when inserted within the vacuum. As a result, the motor utilized to drive the rotating shaft must of necessity be externally situated from the vacuum chamber. Thus, an effective means for providing a seal between the rotating shaft and the wall of the chamber at the point where the shaft enters the vacuum chamber is required. Two primary means are known for attempting to accomplish this. Firstly, seals have been utilized of the rubbing, labyrinth or liquid type. However, these seals have the limitations of relative low speed at which the shaft can rotate, short lifetime and they are not effective to permit a high vacuum within the chamber because they are not completely tight. Perhaps the best in this area is the labyrinth type, which is not actually a seal but provides for a close fitting housing surrounding the rotating shaft adjacent the outside of the chamber. The housing has a plurality of individual chambers within it which are connected to vacuum pumps drawing a vacuum separately on each of these openings. This type of arrangement provides a vacuum of only up to $10^{-6}$ atmospheres which is generally not sufficient for most of the testing purposes. A second type of arrangement is that of the manipulation of a bellows or diaphragm. However, this has the disability relative to the low torque that can be developed as well as the short lifetime and a very poor reliability due to the complexity. With the bellows or diaphragm very little power can be transmitted to the inside of a chamber through the shaft.

An object of this invention is to provide a device for transmitting rotary motion from an external environment into a vacuum chamber without degradation of the vacuum.

Another object of the invention is to provide a device for transmitting rotary motion at high speed into a vacuum chamber without degradation of the vacuum.

A further object of the invention is to provide a device for the transmission of high rotary torque motion into a vacuum chamber without degradation of the vacuum.

Still another object of the invention is to provide a device for the transmission of rotary motion from an external environment into a vacuum chamber without degradation of the vacuum with a device which has a relatively long lifetime and high reliability due to relatively simple construction.

It is believed other objects of the invention will become apparent from the following detailed description in which.

Briefly, the invention involves the admission of the rotating shaft through the center of a conventional vacuum oil diffusion pump. The rotating shaft passes vertically through a cavity sealed and filled with the same oil as used within the main diffusion pump cavity. This external cavity is exposed to the atmospheric pressure. From such external cavity, the shaft then passes through a conventional oil face type seal into the main pump cavity extending upwardly through a conventional diffusion tower to a desired location within the vacuum chamber housing. The oil used within the diffusion pump is the primary sealing medium of the face seals. Leakage of oil through the seals will not destroy the vacuum of the chamber with the limitations of entrained or absorbed gas in the leaking oil. When it is desired to have the shaft admitted in a horizontal position, it is not feasible to utilize an oil diffusion pump which is normally mounted vertically. In the horizontal position the shaft passes horizontally through a double cavity arrangement. A first cavity which is external of the vacuum chamber is filled with oil while a second cavity which is internal of the vacuum chamber and adajacent the first external cavity and is separated therefrom by means of conventional oil face type seals. Any leakage from the external cavity into the internal one is pumped back to the first external cavity. An additional feature of the invention is the utilization of hollow rotating shafts wherein hermetically sealed electrical leads may be emitted through the center thereof into the vacuum chamber. These leads are connected to commutators at the bottom of an external end of the shaft providing electrical contacts.

Figure 1:
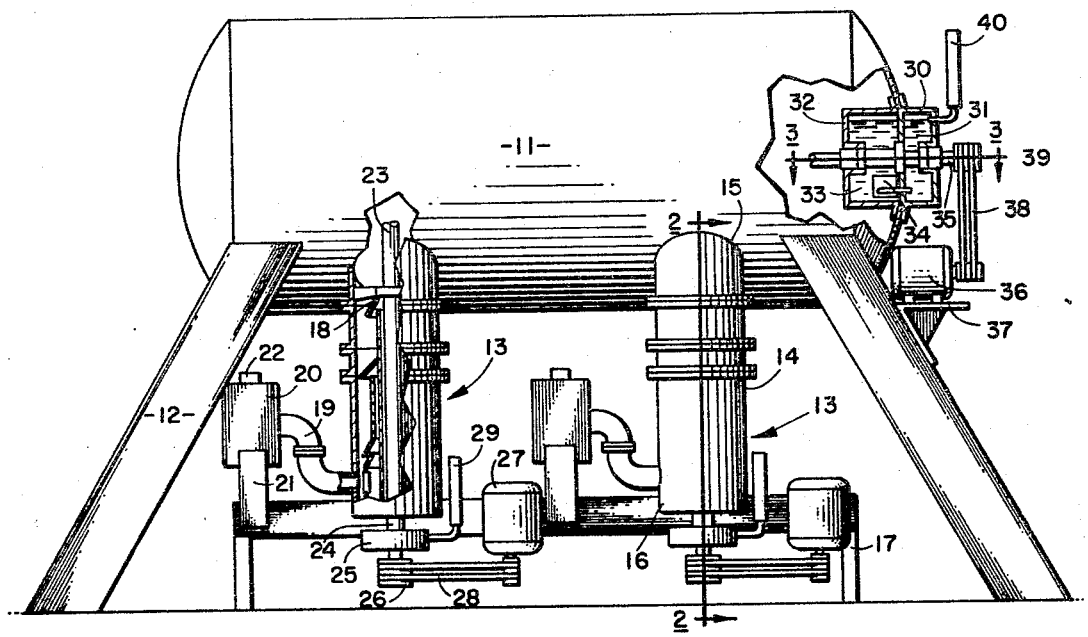
FIG. 1 is a cross-section pictorial view of a vacuum chamber utilizing the novel seal means for admitting rotating shafts thereto.

Referring specifically now to FIG. 1, there is illustrated a typical arrangement utilizing the concepts of this invention. A large conventional vacuum tank 11 is disclosed supported by legs or girders 12. Two conventional oil diffusion vacuum pumps arrangements 13 are disclosed. The number of such pumps will, of course, vary based on their capacity, the size of the vacuum tank, and the vacuum desired. The number herein disclosed is by way of illustration only. The diffusion pumps comprise an elongated cylindrically-shaped housing 14 which intersects the vacuum tank at its upper end 15 and is supported at the lower end 16 by support structure 17. As shown in the cutaway portion of the housing, the diffusion pump has therein conventionally-used baffles 18 which will be shown in more detail in subsequent FIG. 2. A foreline 19 connects the lower end of the housing 14 to a conventional mechanical pump 20 which serves to draw the main part of the vacuum on the tank level. The pump 20 is secured to the support member 17 by a suitable structure 21. Alternatively, of course, it may actually rest right on the support structure. The gas removed from the tank 11 is vented from the pump through a port 22 therein.

The rotating shaft 23 of the invention extends through the center of the diffusion pump 15 into the vacuum chamber 11. The lower end 24 of the shaft 23 passes through an oil bath and seal arrangement 25 which is shown in detail in subsequent FIG. 2. The bottom of the shaft is provided with a pulley 26 so that it may be driven by motor 27 through the belt drive means 28. Oil gauges 29 are provided so that the oil level within the oil bath arrangement 25 may be continually checked. It is noted that the details of the mechanical pumps and drive motors are not shown since they are conventional devices readily obtainable and do not form the essence of the invention.

Still relating to FIG. 1, particular reference is now had to the means disclosed for utilizing a horizontal rotating shaft within the vacuum chamber.

Figure 3:
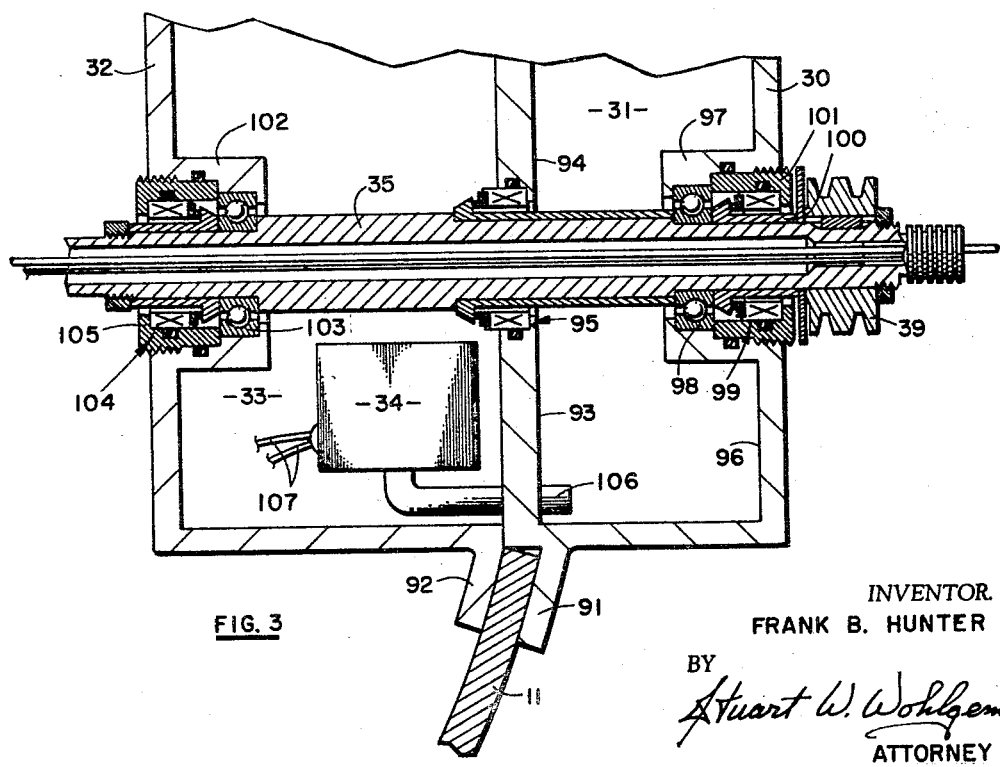
FIG. 3 is a section view for the disclosing of the same mechanism for admitting a rotating shaft in a horizontal position into the vacuum chamber.

An outer housing 30 is provided externally of the vacuum chamber 11 and is affixed thereto in any suitable manner such as bolting or welding and the like. A cavity 31 is provided within the housing which cavity is filled with oil with a low vapor pressure fluid. Examples include DC704 made by Dow Corning and silicone oils. A complementary housing 32 is located internally in the vacuum chamber 11 and has a cavity 33 which is filled with oil. A pump 34 is additionally provided within the cavity 33 and serves to pump oil between the cavities 31 and 33 as will be further explained in detail with reference to FIG. 3. Additional details of the seal mechanisms and the like utilized will also be explained relative to the description of FIG. 3 showing the enlarged portions of such items. The rotating shaft 35 passes concentrically through the housings into the chamber. It is driven by pulley and belt mechanisms similar to that described with reference to the diffusion pumps systems. A motor 36 situated on a support 37 serves to drive the belt 38 which in turn rotates the pulley 39 affixed to the end of the shaft 35. An oil gauge 40 is provided to accurately determine the oil level within the cavity 31. As can be seen from the description of FIG. 1, the invention is not dependent on the presence of a diffusion pump but utilizes such as a convenient means of entry into the vacuum chamber. The invention primarily lies in the sealing arrangement utilizing oil baths as will be shown below. The vacuum contemplated within the chamber is from $10^{-4}$ to below $10^{-6}$ Torr.

Figure 2:
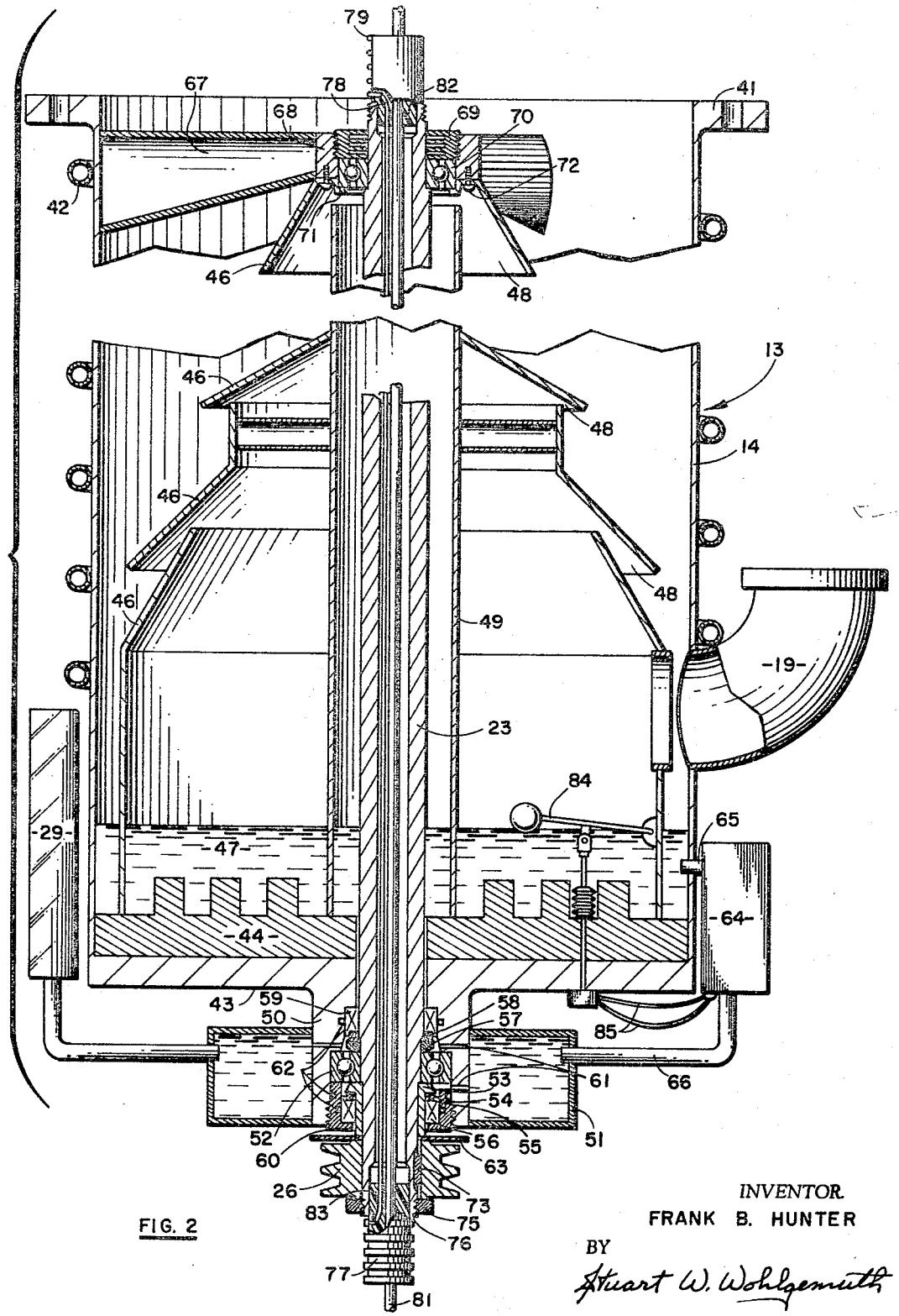
FIG. 2 is a section view of a conventional vacuum diffusion pump having the novel seal and shaft mechanism attached thereto.

Referring now to FIG. 2, there is shown in detail a cross-sectional view of a conventional oil diffusion pump but having a rotating shaft located therein utilizing the novel sealing arrangement of the invention. The outer housing 14 for the diffusion pump is provided with a flange 41 at the top thereof for mounting on the vacuum chamber. Cooling coils 42 surround the outer housing 14, usually about the upper two thirds of the body. The bottom 43 of the device is closed except for the area for admission of the shaft and is provided with an electric heater element 44 which may be a Calrod unit. Within the housing 14 are situated a plurality of concentric conical cylinders 46 capped to leave small opening through which vapor can emerge. This assembly is generally known as the jet assembly. The vapor which rises from the oil 47 heated by the heater 44 rises in concentric columns within the jet assembly and is emitted downwardly from the openings 48 provided in the jet asssembly. The rotating shaft 23 extends concentrically within the cylindrical housing 49 which is normally present in most diffusion pumps. The base portion 43 of the diffusion pump is provided with a downwardly extending cylindrical portion 50 which is machined to closely fit the rotating shaft 23 at its point of contact. Additionally, it provides a housing for the various seals utilized as part of the invention. Adjacent the downwardly extending portion 50 is a housing 51 for an oil bath. Situated within the portion 50 surrounding the shaft are ball bearings 52. On the upper and lower sides of the ball bearings 52 are situated oil face seal mechanisms as will be explained. Situated below the ball bearings 52 and adjacent thereto is a sleeve 53 tight-fitted to the rotating shaft. The sleeve is provided with a radially-extending shoulder 54 upon which a carbon ring 55 is in contact. A conventional mechanical seal 56 acts against the carbon ring 55 forcing it against the shoulder 54. The mechanical seal and carbon ring arrangement is shown in, for example, the bulletin EF100 distributed by the Chicago Rawhide Manufacturing Company and thus is well known in the art. Situated above the ball bearings 52 is a ring member 57 against which carbon ring 58 is forced due to the pressure of mechanical seal 59. The seals and ball bearings are secured in place by a threaded insert 60 situated at the bottom end of the downwardly extending housing 50 and is tight-fitted against the lower mechanical seal 56. Passageway 61 in the downwardly extending portion 50 serve to communicate the oil bath with the oil face seals and provide for circulation for the oil therethrough. A plurality of O-ring seals 62 situated adjacent the mechanical seals and the downwardly extending portion 50 serve to prevent leakage of oil therebetween. It is the presence of this oil surrounding the shaft at the seals that provides a preventive means for any of the atmospheric gas to enter the diffusion pump. A slight amount of oil might leak through the bottom seal 56 to the outside of the device. This leakage is not in any way deleterious to the operation and is accumulated by a ring 63 below the insert 60. Any oil that alternatively passes the upper oil face seal 59 would also flow into the oil bath 47 above the heater. Any excess oil so flowing would be returned to the oil bath 51 by means of the pump 64 connecting lines 65 and 66 between the oil baths 47 and 52. The oil gauge 29 connected to the oil bath 51 serves an indication of the level therein. If this level decreases to an undesirable point, additional oil may be pumped by pump 64 into the bath from the upper oil bath 47.

At the top of the diffusion pump there is present a hollow strut support 67 which is rigidly connected to the inner wall 14 of the pump and serves to support a housing 68 which circumferentially surrounds the rotating shaft 23. Fixedly secured within the housing 68 is a labyrinth seal 69 which surrounds the rotating shaft serving to prevent the escape of the heated oil up the shaft into the chamber. Situated immediately below and adjacent the labyrinth seal 69 are conventional ball bearings 70 which additionally surround the shaft 23. The ball bearings are secured in place by means of an overlapping flange portion 71 of the cylinder 46. The cylinder 46 is secured in place by means of a rivet or bolt 72 fastened to the housing 68.

The rotating shaft is driven by a motor and belt arrangement, as shown particularly in FIG. 1, through the pulley 26 affixed to the lower external end of the shaft. The pulley 26 has a tabular portion 73 or key which fits within a slot provided in the shaft 23. The engagement of the tab within the slot permits the transmission of the energy from the pulley to the shaft to cause the necessary rotational movement. The pulley is secured in place by means of a ring 63 which is seated in the shaft 23 at the uppermost end of the pulley abutting the top and thereof. A locknut 75 secures the bottom end of the pulley 26 by tightening the nut along the threaded portion 76 at the lower extremity of the shaft. Additionally, there may be optionally provided at the very bottom end of the shaft a commutator 77. Electrical leads such as 78 may connect the commutator 77 at the bottom of the shaft to the commutator 79 situated at the top of the shaft which would generally be internally disposed within the vacuum chamber. This provides a means for admitting various electrical sources within the chamber. Additionally, a hydraulic line 81 may run concentrically within the rotating shaft to admit liquids or gases as needed to the chamber, for various purposes. It is to be noted that plug members 82 at the upper end of the shaft and 83 at the lower extremity prevent any escape of the vacuum through the hollow shaft. These plugs hermetically seal the electrical leads such as 78 and the hydraulic lines such as 81.

There may be additionally provisionally provided a conventional float mechanism 84 which serves to maintain the desired level of oil in the vacuum diffusion pump. When the oil level is receded to an undesirable level, the float mechanism 84 will feed through electrical leads 85 a signal to the pump 64 actuating the pump so that oil will be pumped from area 47 within the diffusion pump cavity back to the reservoir 51.

Reference is now had to FIG. 3 showing an exemplary embodiment of the invention wherein it is desired to admit a rotating shaft to a vacuum chamber in a horizontal position. As previously pointed out, it is not practical to admit the shaft through a diffusion pump since diffusion pump operates in a vertical position. In this embodiment a housing 30 having an oil-containing cavity 31 therein is constructed and positioned externally of the vacuum tank and affixed thereto by a flange portion 91 which may be welded to the outer surface of the tank. Situated in the tank and adjacent to the external housing 30 is an internal housing 32 having the oil-containing cavity 33 therein. This internal housing is affixed to the inner wall of the chamber by means of a flange 92 in a similar manner to the external housing. The inner side 93 of the external housing 31 is fitted within an aperture provided in the tank 11 to accommodate the dimensions of the wall 93 and thus forms a continuation of the tank at this point. The inner wall 93 is provided with a housing flange portion 94 immediately adjacent the shaft 35. Seated within this flange portion and tight-fitted thereto is a conventional oil face seal assembly 95 of the arrangement previously described which serves to prevent excessive oil leak between chambers 31 and 33. The outer wall 96 of the external housing 30 is provided with a flange portion 97 extending inwardly toward the vacuum tank. Situated within the flange portion and in contact with the rotating shaft are conventional ball bearings 98 and adjacent to the ball bearings is located a conventional oil face seal assembly 99 which acts on the shoulder of sleeve 100 in the exact manner described in relation to the assembly in FIG. 2. The oil face seal is held in place by a threaded insert 101 which is threaded into the flange 97 and serves to secure both the oil face seal and ball bearing in place. This construction is similar to that seen in FIG. 2 with relation to the seals and ball bearings at the bottom of the rotating shaft therein. This same arrangement is additionally found on the internal housing 32 which has a flange portion 102 containing ball bearing 103 and oil face seal assembly 104 held in place by a threaded insert 105. The pulley is secured to the rotating shaft in the same manner as that shown in FIG. 2. Additionally, the commutator and hydraulic line arrangement is essentially identical to that also shown in FIG. 2.

A pump 34 having electrical leads 107 attached thereto which is located in the internal cavity 33 serves to pump excess oil from the internal cavity 33 through the connecting line 106 into the external cavity 31. The oil gauge 40 as particularly seen in FIG. 1 serves to indicate when the pump should operate due to the higher level of oil in the internal cavity. At all times it is desirable to leave enough oil in the external cavity to completely cover the seals. Alternatively, of course, a float arrangement may be provided as shown in FIG. 2 to automatically actuate the pump when the oil level reaches an undesirable point in the internal cavity 33.

Although the invention has been described and illustrated in detail, it is to be clearly understood that the same is by way of illustration and example only and is not to be taken by way of limitation, the spirit and scope of this invention being limited only by the terms of the appended claims.

What is claimed is:
1. In combination:
an oil diffusion pump having an upper and lower end, said upper end for communication with a vacuum chamber, said pump further provided with a first oil reservoir therein,
a rotatable shaft disposed concentrically within and extending through said pump,
oil face seal means surrounding said shaft at said lower end of said pump,
a second oil reservoir surrounding said seal means and in communication therewith,
and means for transporting the oil from said first reservoir to said second reservoir.
2. The combination of claim 1 additionally comprising: means for rotating said shaft.
3. The combination of claim 1 wherein said shaft is hollow, said combination additionally comprising:
commutator means on said shaft external the upper and lower ends of said pump,
and electrical leads extending through said shaft between said commutator means.
4. The combination of claim 1 additionally comprising:
seal means surrounding said shaft at the upper end of said pump.

References Cited by the Examiner

UNITED STATES PATENTS

| | | | |
|---|---|---|---|
| 2,035,073 | 3/1936 | Karrer | 277—65 |
| 2,244,450 | 6/1941 | Erni | 277—3 |
| 2,381,823 | 8/1945 | La Bour | 277—135 X |
| 2,418,620 | 4/1947 | Brumagim | 277—3 |
| 2,497,479 | 2/1950 | Vlach | 277—18 X |

SAMUEL B. ROTHBERG, *Primary Examiner.*